(12) United States Patent
Lin

(10) Patent No.: US 7,147,353 B2
(45) Date of Patent: Dec. 12, 2006

(54) VEHICLE SEARCHLIGHT

(76) Inventor: Ming-Hui Lin, PO Box 82-144, Taipei (TW)

( * ) Notice: Subject to any disclaimer, the term of this patent is extended or adjusted under 35 U.S.C. 154(b) by 118 days.

(21) Appl. No.: 11/002,412

(22) Filed: Dec. 3, 2004

(65) Prior Publication Data

US 2006/0120095 A1    Jun. 8, 2006

(51) Int. Cl.
*B60Q 3/00* (2006.01)
(52) U.S. Cl. .................. 362/486; 362/269; 362/493
(58) Field of Classification Search ............... 362/493, 362/287, 35, 486, 269
See application file for complete search history.

(56) References Cited

U.S. PATENT DOCUMENTS 1,510,200 A * 9/1924 Watson ..................... 362/496
4,353,110 A * 10/1982 Ellis ............................ 362/35
4,428,037 A * 1/1984 Cardoza et al. ............ 362/250
4,707,014 A * 11/1987 Rich ........................ 296/180.1
4,722,030 A * 1/1988 Bowden ..................... 362/493
4,937,711 A * 6/1990 Shuen ........................ 362/540
5,171,083 A * 12/1992 Rich .......................... 362/493

* cited by examiner

*Primary Examiner*—Ali Alavi
(74) *Attorney, Agent, or Firm*—Leong C. Lei

(57) ABSTRACT

A vehicle searchlight including a mobile hood between two supports, and multiple bulbs with high power charge embedded in the hood to emit light in the same direction; the hood containing a power source to drive a transmission gear to engage with a fixed gear; a pivot being incorporated to the center of the fixed gear to extend through the hood and into both supports; both supports being fixed to a side frame incorporated to the roof of the vehicle to operate the searchlight.

1 Claim, 3 Drawing Sheets

VEHICLE SEARCHLIGHT

BACKGROUND OF THE INVENTION (a) Technical Field of the Invention

The present invention is related to a vehicle searchlight adapted with high power charge bulbs, and more particularly, to one that allows adjustable projection of light beam to produce focused and effective lighting effects.

(b) Description of the Prior Art

The vehicle searchlight of the prior art usually having the light source, i.e., the light fixture directly mounted to the roof or a rack on the roof is found with the following flaws:
1. Not convenient in operation with poor light effects. The light source is prevented from pivoting for adjustment, resulting in poor adjustment of the target of the light projected.
2. Drivability compromised. Since the light source is fixed, irregular shape of the light source and greater drag will generally affect the drivability of the vehicle.

Shortened service life. Whereas the light source is exposed to the air, it is vulnerable to weathering, thus to shorten its service life affected.

SUMMARY OF THE INVENTION

The primary purpose of the present invention is to provide a vehicle searchlight construction that prevents the searchlight from weathering effects. To achieve the purpose, the present invention includes a mobile hold, two supports and multiple bulbs with high power charge. The mobile hood is pivoted at where between two supports. Both supports are fixed to a side rack mounted to the roof of the vehicle and respectively extend into the mobile hood with a dead axle, and both dead axles in turn are connected to a fixed gear. The mobile hood contains a power source to drive a drive gear to mesh with the fixed gear for the mobile hood to generate relative pivoting and to stay in a preset angle of inclination. Once the mobile opens up, the beam of light is projected at where as preset; and when the mobile hood is retracted, those multiple bulbs with high power charge are protected from weathering effects thus to extend their expected service life.

Another purpose of the present invention is to provide a vehicle searchlight construction that allows precision adjustment of the opening angle of the mobile hood for the light to effectively project at where as desired.

Another purpose yet of the present invention is to provide a vehicle searchlight construction that has a streamline mobile hood so to achieve the lower drag when retracted to avoid affecting the drivability of the vehicle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
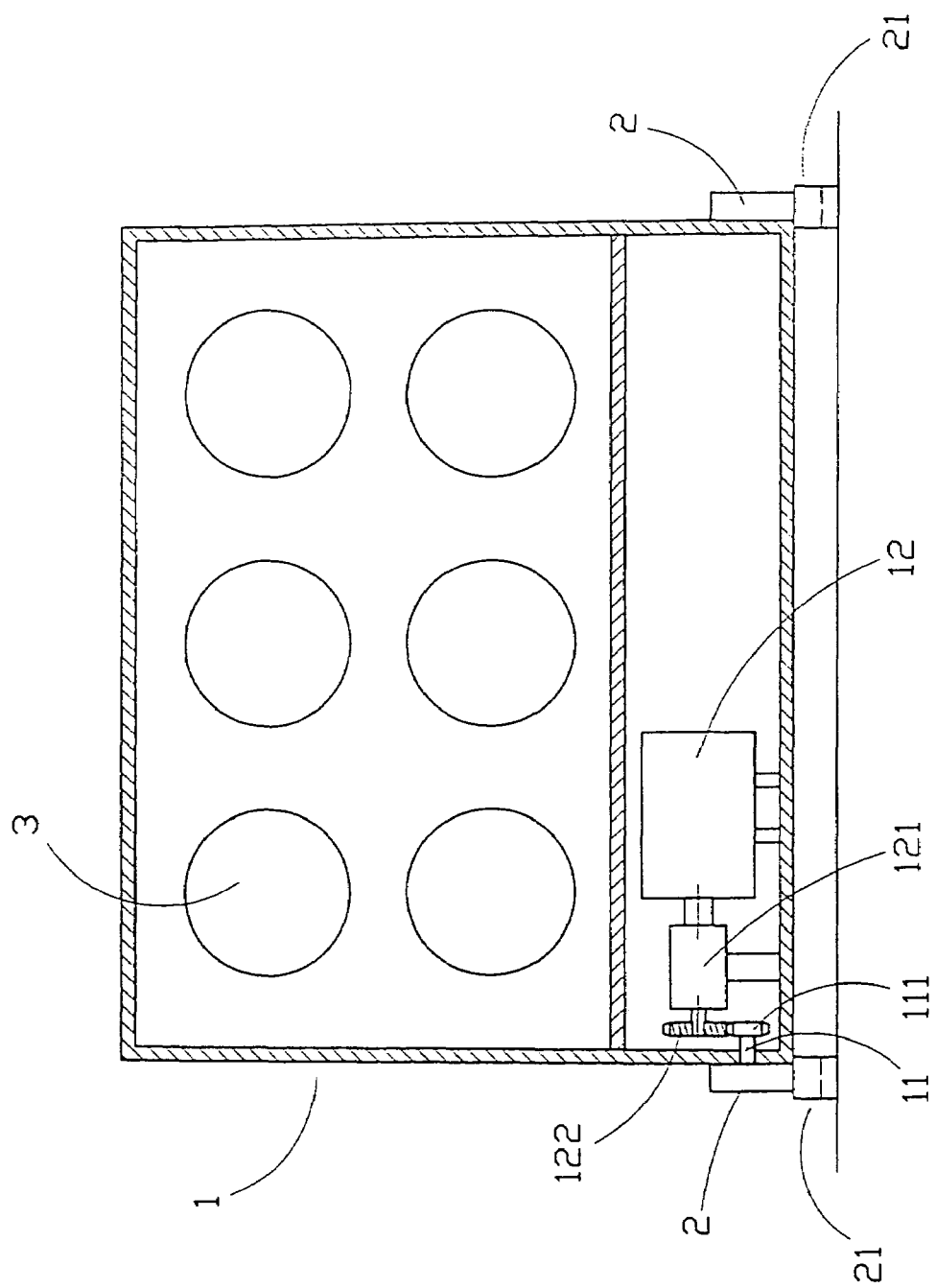
FIG. 1 is a layout showing a construction of the present invention.

Referring to FIG. 1, a preferred embodiment of the present invention is essentially comprised of a mobile hood 1, two supports, and multiple bulbs with high power charge. Wherein, the mobile hood contains one or multiple power sources 12. The power source 12 is related to a step motor that permits precision control of revolution per minute (RPM) having its output axle linked to a drive gear 122 through a reduction gear box 121 to reduce RPM and increase torque. The drive gear 122 is meshed with a fixed gear 111. Both ends of a pivot 11 linked to the fixed gear 111 respectively extend through the hood 1 on both sides of the hood 1. Both supports 2 are fixed to a side rack 21 mounted on the roof of the vehicle. Both ends of the pivot 11 extending out of the mobile hood 1 are respectively inserted into and secured in the supports 2. Those multiple bulbs 3 with high power charge related to halogen lamps or HIDs are contained in the mobile hood 1 and projecting the beam light in the same direction.

Figure 2:
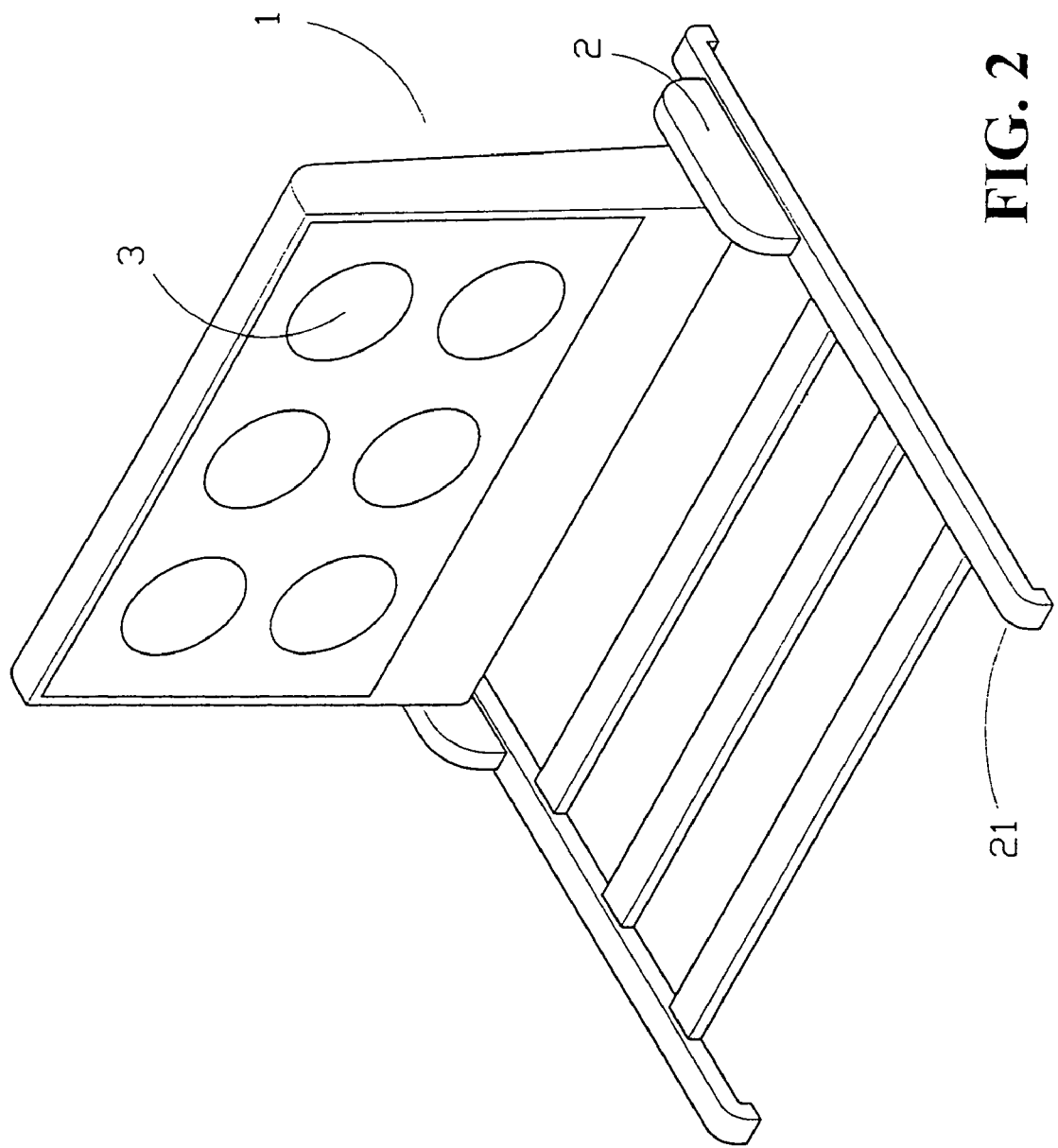
FIG. 2 is a schematic view showing that a mobile hood in the present invention opens up.
Figure 3:
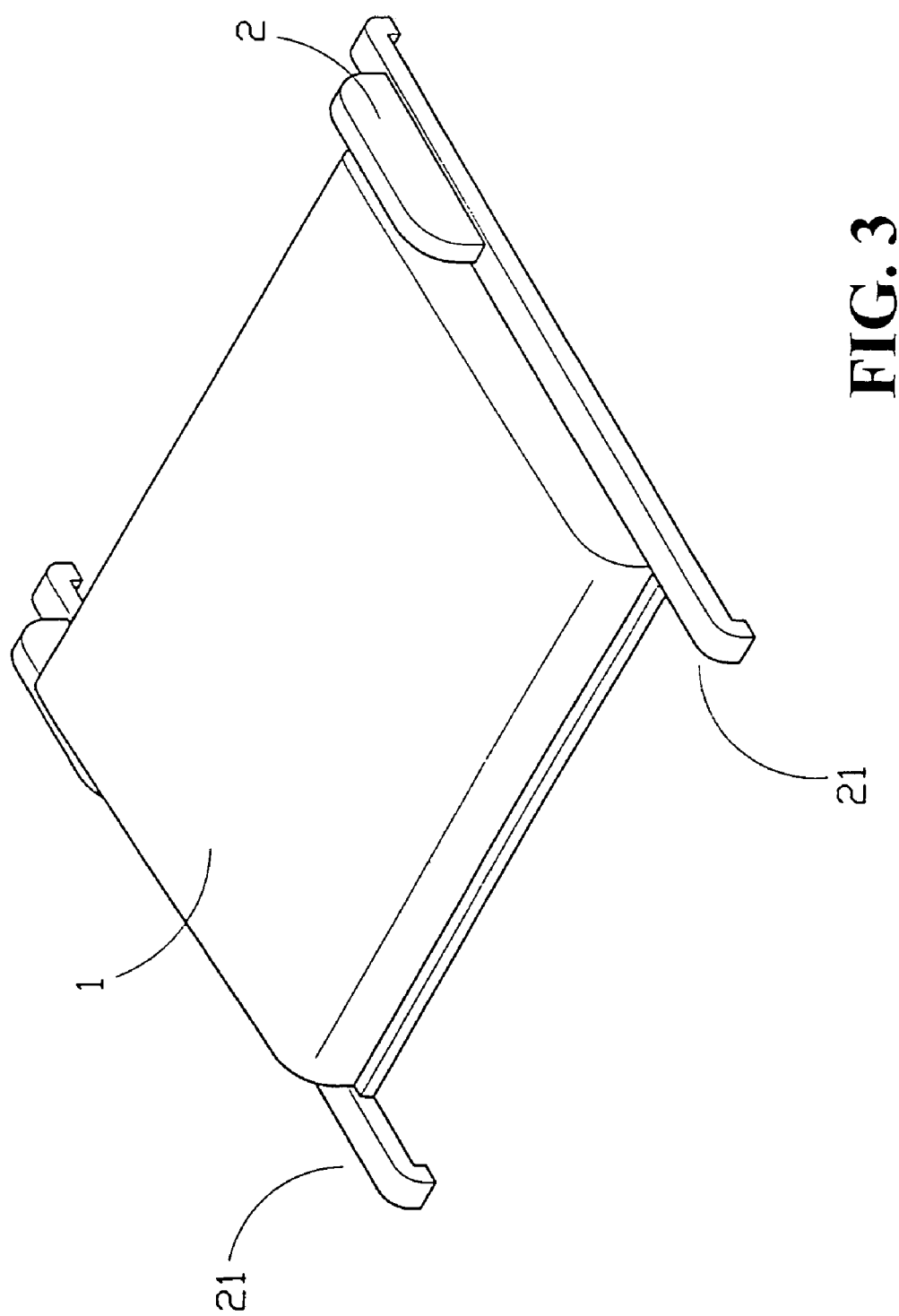
FIG. 3 is a schematic view showing that the mobile hold in the preset invention is retracted.

As illustrated in FIG. 2, when the mobile hood 1 opens up and the power source 12 is activated, the drive gear 122 starts to operate. The mobile hood 1 engages in relative pivoting thus to stay in position at any given angle of inclination since the fixed gear 111 is dead for being restricted by the pivot 11. Accordingly, beam of light projected from those multiple bulbs 3 is focused at a preset location. Once the mobile hood 1 is retracted as illustrated in FIG. 3, those multiple bulbs 3 are lowered to stay flushed with the roof of the vehicle to be protected by the mobile hood from being subject to weathering effects. While extending the service life of those multiple bulbs 3, the streamlined mobile hood 1 helps minimize its impacts upon the drivability of the vehicle.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:
1. A vehicle searchlight comprising:
   a mobile hood;
   two supports pivotally connected with said mobile hood;
   a step motor mounted in said mobile hood and having an output axle;
   a drive gear linked to said output axle via a reduction gear box;
   a fixed gear meshed with said drive gear;
   a pivot having a first end pivotally connected with said fixed gear and a second end pivotally connected with one of said supports;
   another one of said supports being pivotally connected with one side of said mobile hood;
   a rack on which are mounted said supports; and
   a plurality of bulbs arranged in said mobile hood and projecting beam light in same direction.

* * * * *